March 27, 1934.   T. R. JONES   1,952,073
CUTTING MACHINE
Filed April 13, 1932   3 Sheets-Sheet 1

Inventor
Thomas R. Jones
By Rector, Hibben, Davis, & Macauley Attys

March 27, 1934.  T. R. JONES  1,952,073
CUTTING MACHINE
Filed April 13, 1932   3 Sheets-Sheet 2

Inventor
Thomas R. Jones
By Reeter Hibben Davis & Macaulay Attys.

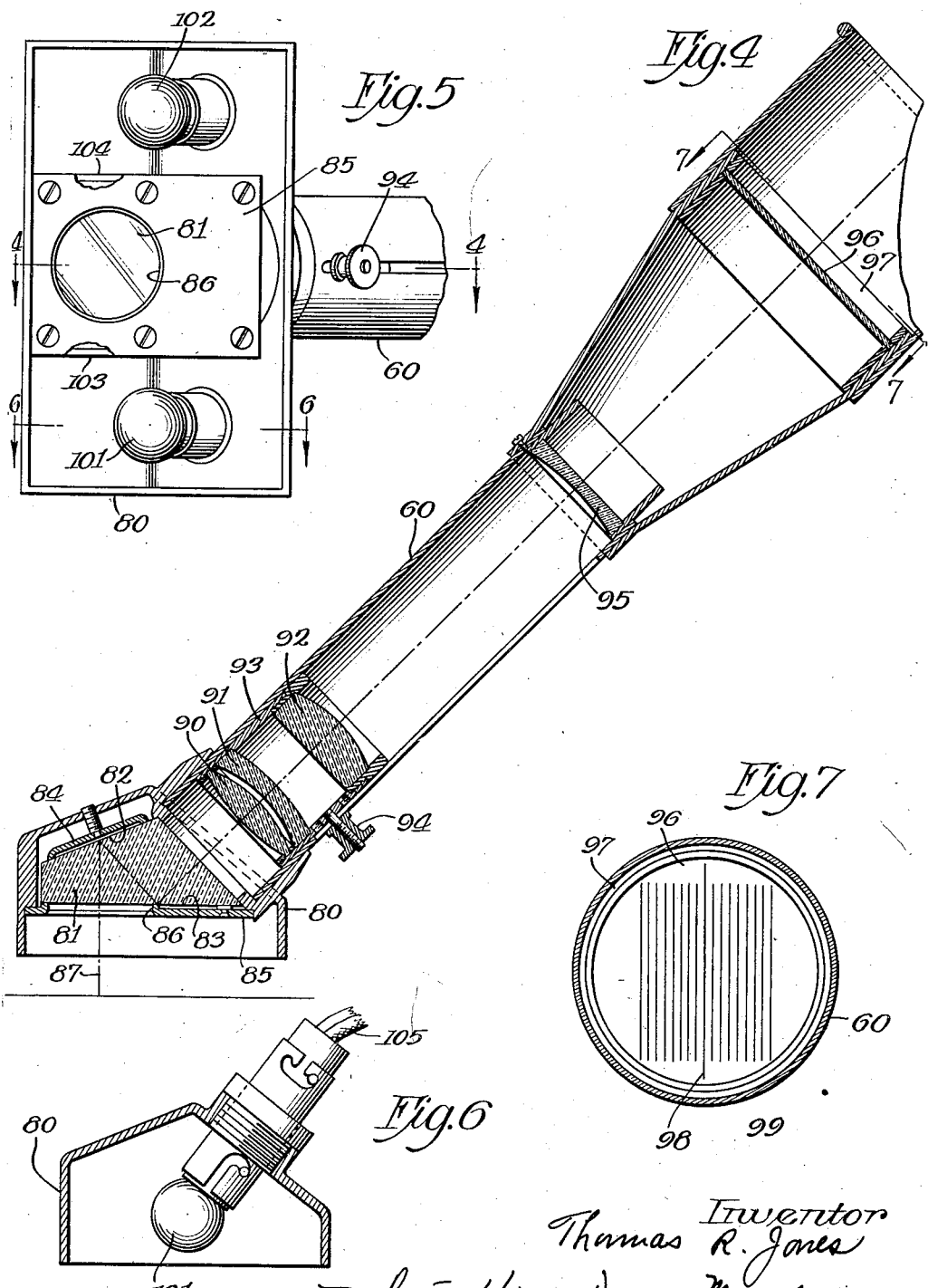

Patented Mar. 27, 1934

1,952,073

UNITED STATES PATENT OFFICE 1,952,073

CUTTING MACHINE

Thomas R. Jones, Cleveland, Ohio, assignor to Harris Seybold Potter Company, Cleveland, Ohio, a corporation of Delaware Application April 13, 1932, Serial No. 604,897

18 Claims. (Cl. 164—48)

This invention relates to a cutting machine for cutting paper, textiles, rubber and the like. It relates particularly to a construction that will increase the ease and speed with which the material to be cut may be brought to a very accurate cutting position. The invention will be described as it is applied to a paper cutter, but it is to be understood that it is not limited to such machines.

Paper cutters usually include a table for receiving and supporting the paper to be cut, side and rear guides for squaring the paper, the rear guide being movable to bring the paper to cutting position, a clamp for holding the paper while it is being cut, and a cutting knife, usually power operated, for cutting the paper after it has been positioned.

When paper is cut on power operated paper cutters, it is cut in piles or "lifts" of several hundred sheets, having a thickness of pile up to five inches or more. These "lifts" are placed on or built up on the table by the operator, pushed to the rear and to the side for squaring the pile, after which the rear gauge or guide is brought forward by hand or power to push the paper up to the cutting line. The paper may be either plain or printed, but, in either case, it must be cut accurately to line, and this is particularly true when the paper is printed. For example, in the case of labels where a large number of labels of different size and shape are printed in a single sheet, it is necessary to cut the big sheets at irregular intervals and, in many cases, very accurately, for example, to within .003 or .004 of an inch. The necessity for this accuracy is twofold, first, appearance, and second, the labels must be very accurate in order to be used in labeling machines and placed on articles where exact dimensions are necessary.

The normal position for the operator of a paper cutter is at the front of it. In this position he is at a considerable distance from the cutting knife because the paper table must extend forward far enough to support the paper that projects to the front of the cutting knife. The operator's position makes it difficult for him to determine when the paper has been brought to cutting position because he is at a considerable distance from it and he is looking at the paper from an angle. In order to overcome this difficulty the usual practice has been to provide a graduated endless tape that moves with the rear guide as the latter is moved to bring the paper to cutting position. This tape extends to the front of the machine where it is visible to the operator and a suitable reference mark or line is provided at the front of the machine to enable the operator to read the tape relative to this mark. These tapes are generally graduated in sixteenths of an inch which does not enable the paper to be adjusted very accurately. One of the difficulties with these tapes is that the mechanical elements for transmitting motion to them may get out of adjustment, or wear slightly, so that the tapes are not accurate, within the limits required. Another very practical difficulty is that the use of a tape requires that the operator calculate the distance or number of graduations that the tape must move in order to move the paper from one position to another. For example, assume that the tape is at a certain point midway between two graduations on the tape. Assume also, that paper must be moved forward for the next cut a given distance in inches to within three or four thousandths of an inch. The operator must figure out how many graduations this will be on the tape and determine at just what point the tape must stop. This is slow and difficult, and it is practically impossible to position the paper within close limits. In fact, in cases where accurate cutting is desired, and where the cut must be closely registered with the pattern on the material to be cut, the operator cannot depend on the tape. Instead, he brings down the clamp by means of a foot lever which is provided for this purpose. The front face of the clamp, when resting on the paper, indicates just where the knife will strike. He thus tests the position of the paper, raises the clamp, edges the paper to a new position, tests with the clamp again, and repeats this process until the paper is in accurate position. Obviously, it is slow, tedious, and inconvenient.

The present invention has been devised to overcome these difficulties and it comprehends the provision of a machine in which the position of the material to be cut relative to the line on which the knife will cut is clearly and easily visible to an operator from his normal position so that he may quickly and accurately bring the material to be cut to cutting position by observing the position of said material relative to the cutting line of the knife as said material approaches cutting position.

The general object of the invention is to provide an improved cutting machine.

A more particular object is to provide a cutting machine in which the material to be cut may be quickly and accurately positioned relative to the cutting line of the knife.

Another object is to provide a paper cutter in which the position of the paper relative to the cutting line of the knife is made visible to the operator from his normal position in front of the machine by means of an optical device that gives him a clear and, if desired, a magnified view.

Other and more particular objects will appear from the following specification and drawings.

An embodiment of the invention is shown in the accompanying drawings in which:

Fig. 4 is a section of the optical device employed for transferring the image of the cutting line to the front of the machine, the section being on the line 4—4 of Fig. 5;

Fig. 5 is a bottom plan view of the lower end of the optical device shown in Fig. 4;

Fig. 6 is a sectional view on the line 6—6 of Fig. 5;

Fig. 7 is a section on the line 7—7 of Fig. 4.

Figure 1:
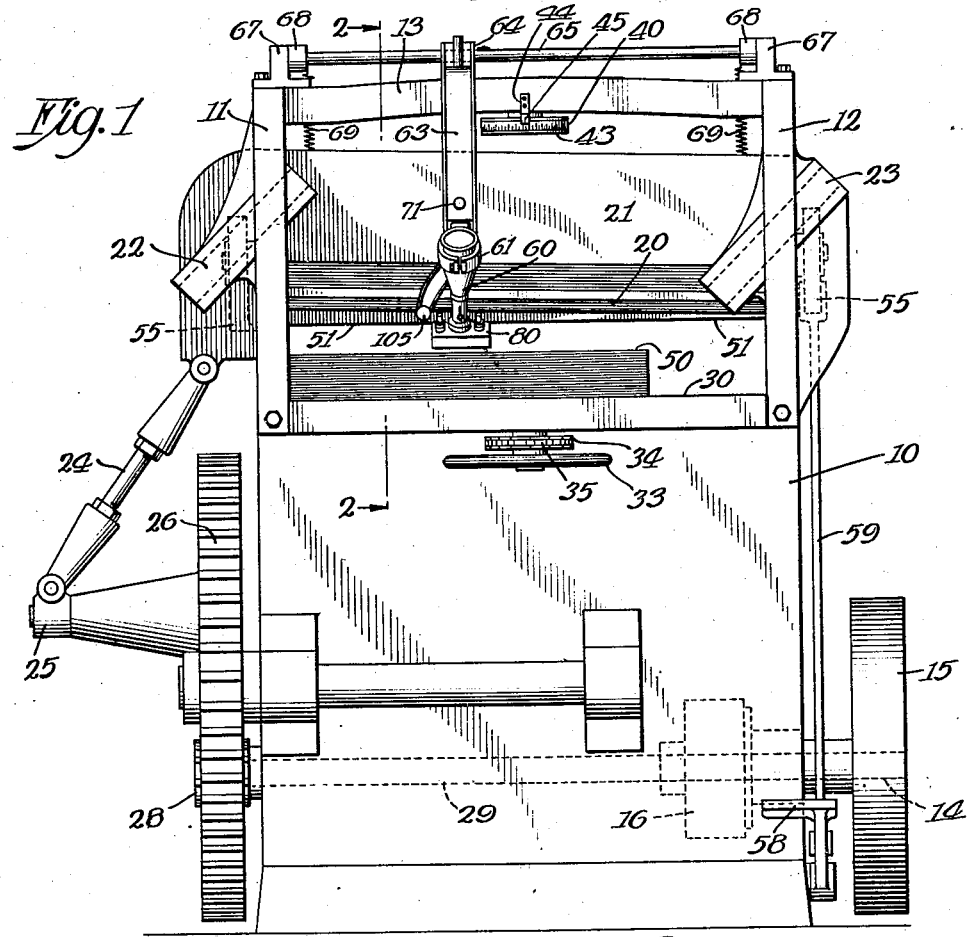
Figure 1 is a front elevation of a paper cutter embodying the invention.

The paper cutter is provided with a base 10 having two vertical side standards 11 and 12 joined by a cross member 13. Mounted in the lower portion of the base is a power shaft 14 supporting a drive pulley 15 that may be driven from any suitable source of power, preferably an electric motor. The drive shaft is provided with a suitable clutch 16 by means of which the operator may cause the power drive to give the machine a stroke of operation, the arrangement being such that the machine is stopped after the knife has been given one stroke, that is, after it moves down to cut the paper and is returned to its upper position.

The paper knife includes a blade 20 detachably carried by a blade carrier 21 that is slidably mounted in inclined guides 22 and 23 so that, as the blade is moved downwardly, it is also given a longitudinal motion to improve its cutting action. The blade carrier 21 is connected by means of an adjustable link 24 to a crank 25 on a gear 26 journaled on a stud shaft supported by the machine frame. This gear is driven from the power shaft 16 through suitable reduction gearing including the gear 28, the latter being fixed to a shaft 29 that is connected to the clutch 16.

Figure 2:
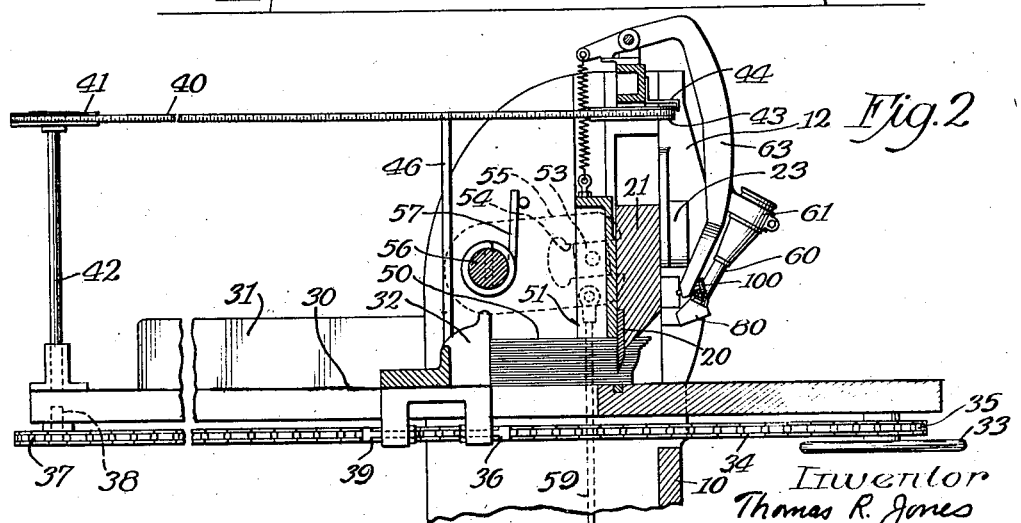
Fig. 2 is a longitudinal section and side elevation of the upper portion of the paper cutter including the paper table on the line 2—2 of Fig. 1.

The paper table 30 is provided with side plates 31, one of which is shown in Fig. 2. These side plates, particularly the left hand one as viewed from the front, form side gauges or guides against which the paper may be "squared" for cutting. Slidably mounted on the paper table is a rear guide or gauge 32 which is operable to push the paper forward to cutting position. This rear gauge or pusher can be moved back and forth by hand or by power. In the embodiment of the invention illustrated, the pusher is moved by a hand wheel 33 located at the front of the machine. A sprocket chain 34 passes over a sprocket 35 on the shaft of the hand wheel and one end of the chain is connected at 36 to a projection on the rear gauge 32. The other end of the chain extends to the rear of the machine where it passes over a sprocket wheel 37 fixed to a shaft 38 journaled in the table 30. After passing around the sprocket 37 the chain extends forward and is connected at 39 to a projection on the rear gauge 32. The rear gauge can thus be moved back and forth directly by turning the hand wheel.

The machine may, if desired, be provided with the old type of gauge for roughly determining the position of the paper in cases where accurate positioning is not desired. A graduated steel tape 40 passes around a rear disk 41 rotatably mounted on a post 42 fixed in the bed plate 30. This tape also passes around a front disk 43 rotatably mounted in the machine frame. A small projection 44 having a reference line 45 on it extends down from the machine frame and the tape passes this for reading purposes. The tape is moved with the paper by means of a post 46 fixed at one end to the back gauge 32 (Fig. 2) and at its other end to the tape 40. This old type of tape gauge is not necessary in connection with the present invention, but may be left on the machine if desired.

After the paper, of which a stack 50 is shown in Fig. 2, is brought to cutting position, it is clamped by means of a relatively heavy clamping plate 51 slidably mounted in the vertical guideways 52 (Fig. 3) on the machine frame. Mounted on each end of the clamp is a roller stud 53 of which one is shown in Fig. 2. These studs operate in slots 54 in arms 55 fixed to a shaft 56 which is urged counterclockwise (Fig. 2) by a spring 57. The clamp 51 is thus normally held in its raised position. It may be brought down to clamping position by means of a foot lever 58 (Fig. 1) connected by a link 59 to the right hand clamp arm 55. The clamp is also brought down to clamping position by power through a mechanism not shown in the present application as an understanding of it is not necessary for an understanding of the present invention, such mechanism being described and illustrated more clearly, for example, in Patent No. 1,451,120.

In operation, the operator places the paper on the table 30, registers and squares it against the rear and side gauges, and then brings it forward by means of the hand wheel 33 and rear gauge 32. When it has been properly positioned the machine is given a stroke of operation during which the clamp 51 first moves down to hold the paper firmly in position after which the cutting knife 20 comes down, cuts the paper, and returns to its upper position, the clamp 51 holding the paper until the knife has left it after which the clamp is raised. The cut paper is then removed, and the pile is again brought forward to cutting position.

As previously mentioned, the present invention comprehends making the position of the paper relative to the cutting line of the knife clearly visible to an operator from his position at the front of the machine so that he can accurately position the paper by direct observation while he is in his normal position. In the embodiment illustrated this is done by means of an optical device.

A tube 60 is supported in an inclined position on the frame work of the machine by a clamp 61 fixed to the lower end of a rod 62 slidably mounted in one arm 63 of an elbow member or lever 64 that is keyed by a key 65 to a rotatable shaft 66 supported by brackets 67 (Fig. 1) on the machine frame. The lever 64 is slidable on the shaft 66 to enable it to be adjusted to different positions across the machine but, in whatever position it occupies, it rotates with shaft 66 by reason of the key connection 65. Two arms 68 (Figs. 1 and 3) are fixed to shaft 66 and yieldingly connected by springs 69 to the upper end of the clamp 51.

The rod 62 is urged upwardly by a spring 70 but it is normally held against movement by a set screw 71. The spring prevents the rod 62 and its tube 60 from dropping when the set screw is loosened. In fact, the rod moves upward when the set screw is loosened and the operator adjusts the position of the rod by allowing it to move upward or by putting it down against the tension of the spring.

Figure 3:
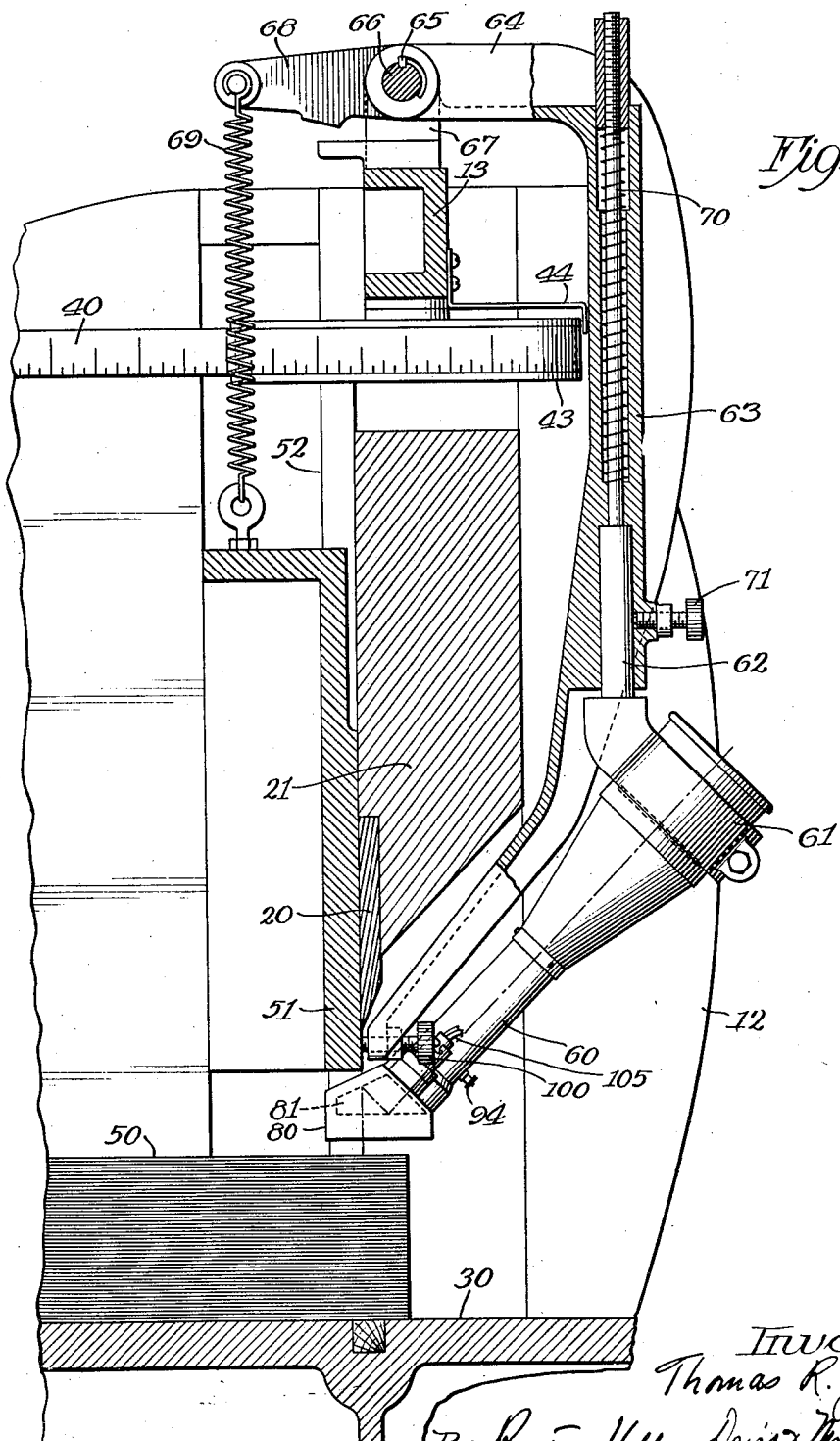
Fig. 3 is a partial cross section and side elevation showing particularly the cutting knife and the means for making the cutting line visible to the operator.

When the parts are in the position shown in Fig. 3, the lower end of the tube 60 is over the cutting line of the paper knife and beneath the clamp 51. As the clamp 51 moves down to clamp the paper, the lever 64 is rocked counterclockwise to swing the tube 60 out of the path of clamp 51 and the paper knife 20. When the clamp 51 returns to normal, the tube 60 again moves to the position of Fig. 3, the tube and its supporting parts being weighted so that they normally tend to move to this position. The tube 60 is thus automatically moved into and out of active position as the machine is operated.

The lower end of the tube 60 carries a hood 80 in which is mounted a reflecting prism or lens 81 (Fig. 4) having two reflecting surfaces 82 and 83. This lens is held in position against an adjustable abutment 84 by a removable bottom plate 85 detachably attached to the lower end of the hood 80. The bottom plate 85 has a circular opening 86 in it (Fig. 5) which is of sufficient size to give a view of the paper to be cut as it approaches the line on which the knife moves. When there is no paper under the opening, a view of the wooden cutting stick with the line on it made by the knife is visible through the opening and this may be used in adjusting the device as will be later described.

An image of the portion of the paper below the opening 86 is reflected downward from the surface 82 of the prism 81, as indicated by the line 87 (Fig. 3) and then reflected upward in the direction of the axis of tube 60 by the surface 83. The image then passes through lenses 90, 91 and 92 mounted in a sleeve 93 adjustably mounted in tube 60, the sleeve being held in its adjusted positions by a set screw 94. This adjustable mounting for sleeve 93 enables the instrument to be easily focused. The image next passes through the lens 95 in the upper end of tube 60 from where it is projected onto the reticle 96 carried by a sleeve 97 screw-threaded into the upper enlarged end of tube 60. This reticle has a line 98 marked on it which represents the cutting line of the knife 20 and is a replica of a portion thereof.

The tube 60 is adjusted so that the line 98 coincides with the line of cut of the knife by means of a set screw 100 (Fig. 3) which abuts against the clamp 51 and determines the final working position of the tube. Rough adjustments may be made by changing the position of the tube 60 in clamp 61. In adjusting the tube, use may be made of the line made by the knife on the wooden cutting stick. An image of this line will appear on the reticle when no paper is under the knife and the line 98 on the reticle can be brought into coincidence with this image.

The height of the tube above the paper may be varied by changing the position of rod 62.

For the purpose of improving the visibility of the images a lighting means is provided comprising two electric bulbs 101 and 102 (Fig. 5) mounted in the hood 80 on opposite sides of the prism 81, the sides of the prism being covered by metal plates 103 and 104 attached to hood 80. Suitable electric wires 105 (Fig. 6) are connected to the lights and extend upwardly along the tube 60 to the upper part of the machine from where they are led to a source of electric current.

The device is operated as follows:

The tube 60 is adjusted to the proper height for the stacks of paper to be cut, it is focused, and it is adjusted so that the line 98 on the reticle coincides exactly with the cutting line of the paper knife. After these adjustments are once made, they do not have to be repeated unless extra high or extra low stacks of papers are to be cut in which event the height of the tube 60 may be varied.

The operator brings the paper up toward cutting position by the hand wheel and, as the paper approaches cutting position he looks into tube 60. He sees there a magnified image of the paper moving across the reticle. As the cutting line on the paper approaches the line 98, he can slow down the hand wheel and move the paper slowly until the paper cutting line coincides exactly with the line 98. These two lines can be made to coincide very exactly owing to the fact that the image of the paper is magnified and the paper can thus be very accurately brought to cutting position. If desired, the recticle 96 can be provided with a plurality of lines spaced apart uniformly as indicated at 99 in Fig. 7 each space representing a certain distance. The line 98 can then be a red line so as to distinguish it from the others which may be black. These extra lines provide an indication to the operator that will tell him instantly about how much farther he has to move the paper to bring it to cutting position.

After the paper is positioned, the machine is operated to cut the paper. During the operation, the optical tube 60 is automatically moved out of the way and as the machine operation is completed, said tube is again automatically moved back to active position.

With this device, it is not necessary for an operator to make calculations in order to bring the paper up to proper cutting position, nor is it necessary for him to read a graduated tape. All that he need do is to look at the recticle 96 which is in convenient position immediately in front of him. The image of the paper appears on the recticle and, as the portion of the paper where a cut is to be made approaches the cutting line, he simply controls the paper movement to bring the cutting line on the paper into accurate coincidence with the cutting line on the reticle. After having adjusted the paper to proper cutting position, he sets the machine into operation in the usual manner and he need pay no attention to the registering device because it automatically moves out of the way as the paper is cut and then automatically moves back to position after the cutting operation has been completed.

This construction enables an operator to cut paper much more rapidly and accurately than has heretofore been possible and presents many advantages over the old methods employed. The registering device is simple, capable of easy adjustment and does not interfere with the usual operation of the machine and it is relatively inexpensive when the increased speed of operation is considered.

The invention has been shown in an embodiment in which a replica of the cutting line is marked on the reticle of the optical device. This is the preferred form, but this line can be omitted when a line or mark is made on the machine below the optical device so that said device projects an image of the cutting mark as well as the paper onto the reticle.

The invention may not only be built into a cutter at the time the latter is manufactured, but it may also be applied to existing cutters as an attachment. For example, the brackets 67 supporting shaft 65 and the optical device can be attached to the top of the framework of a machine, the spring 69 can be attached to the clamp of the machine, and after adjusting the device, it is in condition for operation.

It is to be understood that the construction shown is for purposes of illustration only and that variations may be made in it without departing from the spirit and scope of the invention as defined by the appended claims.

I claim:

1. A cutter having a table for supporting a stack of sheets to be cut, a movable cutting knife for cutting said sheets, said cutting knife being guided to cut along a cutting line whose exact position cannot be readily determined by an operator from his normal position in control of the machine, means under the control of an operator for moving the stack of sheets toward cutting position relative to said cutting line, means making the sheets to be cut and their position relative to said cutting line readily and accurately visible to the operator from his normal position in control of the machine whereby he may register the sheets with the cutting line by observation of said relative position as the sheets are moved to cutting position, clamping means for holding the stack of sheets in cutting position after they have been positioned, and means for operating the cutting knife.

2. A cutter having a table for supporting a stack of sheets to be cut, a movable cutting knife for cutting said sheets, said knife being guided to cut along a cutting line whose exact position cannot be readily determined by an operator from his normal position in control of the machine, means under the control of an operator for moving said stack of sheets to cutting position, an optical device for projecting to a position where it may be readily observed by an operator from his normal position in control of the machine an image showing the sheets to be cut in their position relative to the cutting line whereby said relative position may be continuously observed as said sheets are brought to cutting position, clamping means for holding the sheets in cutting position after they have been positioned, and means for operating said cutting knife.

3. A cutter having a table for supporting a stack of sheets to be cut, a movable cutting knife for cutting said sheets, said knife being guided to cut along a cutting line whose exact position cannot be readily determined by an operator from his normal position in control of the machine, means under the control of an operator for moving said stack of sheets to cutting position, an optical device having a replica of said cutting line positioned where it is readily visible to an operator from his normal position in control of the machine, said optical device including means projecting an image of a portion of said stack of sheets to a position adjacent said replica whereby the operator may observe the relative position of the sheets and the replica to enable him to register the sheets to be cut in accurate cutting position, clamping means for holding the stack in cutting position after it has been positioned, and means for operating the cutting knife.

4. A cutter having a table for supporting a stack of sheets to be cut, a movable cutting knife for cutting said sheets, said knife being guided to cut along a cutting line whose exact position cannot be readily determined by an operator from his normal position in control of the machine, means under the control of an operator for moving said stack to cutting position, an optical device having means for transferring an image of a portion of said stack adjacent said cutting line to a position where it is conveniently visible to an operator in his normal position in control of the machine, said optical device having a mark thereon adjacent the position of said image which mark accurately indicates the cutting line of the machine, whereby the operator may readily and continuously observe the position of the sheets to be cut relative to the cutting line as the sheets are being moved to cutting position.

5. A cutter having a table for supporting a stack of sheets to be cut, a movable cutting knife for cutting said sheets, said knife being guided to cut along a cutting line whose exact position cannot be readily determined by an operator from his normal position in control of the machine, means under the control of an operator for moving said stack to cutting position, an optical device supported at the front of the machine, one end of said device being adjacent said cutting line and the other end being positioned at the front of the machine where an operator may readily observe it from his normal position in control of the machine, a reticle in said other end of said device having a line thereon representing the cutting line of the machine, and means associated with said optical device for projecting onto said reticle an image of a portion of the stack of sheets adjacent the cutting line whereby the registration of the sheets to be cut and the cutting line may be observed by observing said reticle.

6. A cutter having a table for supporting a stack of sheets to be cut, a movable cutting knife for cutting said sheets, said knife being guided to cut along a cutting line whose exact position cannot be readily determined by an operator from his normal position in control of the machine, means under the control of an operator for moving the stack to cutting position, an optical device supported at the front of the machine, one end of said device being adjacent said cutting line and the other end being in a position where it is readily visible to an operator from his normal position in control of the machine, a reticle in said other end of said device having a line thereon comprising a replica of a portion of the cutting line of the machine, a reflecting prism in the first mentioned end of said device, and lenses in said device for projecting the image reflected by said prism onto said reticle whereby the operator may readily observe the registration of the sheets to be cut with the cutting line by observing said reticle.

7. A cutter having a table for supporting a stack of sheets to be cut, a movable cutting knife for cutting said sheets, said knife being guided so as to cut along a cutting line whose exact position cannot be readily determined by an operator from his normal position in control of the machine, means under the control of an operator for moving the stack to cutting position, an optical device supported at the front of the machine with its lower end positioned above the cutting line of said machine, said lower end having a hood containing a lighting means for illuminating the space beneath said hood and means associated with said optical device for projecting an image of what is beneath said hood onto a reticle in the upper end of said device, said reticle being in a position where it may be readily observed by an operator while in his normal position in control of the machine.

8. A cutter having a table for supporting a stack of sheets to be cut, a movable cutting knife for cutting said sheets, means for moving said knife to cut said sheets, said knife being guided to cut along a cutting line whose exact position cannot be readily determined by an operator from his normal position in control of the machine, indicating means rendering the position of the sheets to be cut relative to said cutting line readily visible to the operator from his normal position in control of the machine, a portion of said indicating means being normally in the path of said cutting knife, and means acting to automatically move said indicating means from the path of said knife as the knife is moved to cut the sheets.

9. A cutter having a table for supporting a stack of sheets to be cut, a movable cutting knife, means for moving said knife to cut the sheets and for returning it to normal, said knife being guided to cut along a cutting line whose exact position cannot be readily determined by an operator from his normal position in control of the machine, an optical device for making the position of the sheets to be cut relative to the cutting line readily visible to the operator in his normal position, said optical device having portions projecting into the path of said cutting knife, and means acting to automatically move said optical device out of the path of said cutting knife as the knife is moved to cut the sheets and to return said device to normal as the cutting knife returns to normal.

10. A cutter having a table for supporting a stack of sheets to be cut, a movable cutting knife, means for moving said knife to cut the sheets and for returning it to normal position, said knife being guided to cut along a cutting line whose exact position cannot be readily determined by an operator from his normal position in control of the machine, an optical device having means for making the position of the sheets to be cut relative to the cutting line readily visible to an operator in his normal position, a pivoted member supporting said optical device with one end of said device normally in the path of said cutting knife, and means acting automatically to rock said member as the cutting knife moves to cutting position to thereby swing the optical device out of the path of said cutting knife, said member returning the optical device to normal as the cutting knife returns to normal.

11. A cutter having a table for supporting a stack of sheets to be cut, a clamp movable to a position to hold the sheets while being cut and returnable to normal, a cutting knife movable up and down, means for moving said knife downward to cut said sheets and for returning it upward to normal, said knife being guided to cut along a cutting line whose exact position cannot be readily determined by an operator from his normal position in control of the machine, an optical device for rendering the position of the sheets to be cut relative to said cutting line readily visible to an operator from his normal position at the front of the machine, a movable member supporting said optical device with one end of the device normally in the path of said cutting knife, and connections between said member and said clamp for moving said member as the clamp is moved to hold the stack whereby the optical device is rocked out of the path of said knife, said member returning to normal position as the clamp is raised after the cutting operation has taken place.

12. A cutter having a table for supporting a stack of sheets to be cut, a movable cutting knife, means for moving the knife down to cut said sheets and for returning it to normal, said knife being guided to cut along a cutting line whose exact position cannot be readily determined by an operator from his normal position in control of the machine, an optical device making the position of the sheets to be cut relative to the cutting line readily visible to an operator in his normal position, a member supporting said optical device with one end of said device normally in the path of said cutting knife, said member being slidably mounted on a rock shaft at the upper portion of said machine whereby said optical device may be adjusted laterally across said machine, and means for rocking said shaft as the cutting knife is moved to cutting position to thereby automatically remove said optical device from the path of said cutting knife.

13. A cutter having a table for supporting a stack of sheets to be cut, a movable cutting knife, means for moving said knife downward to cut said sheets and for returning it upward to normal, said knife being guided to cut along a cutting line whose position cannot be readily determined by an operator from his normal position in control of the machine, an optical device provided with means for making the position of the sheets to be cut relative to the cutting line readily visible to the operator from his normal position, a member supporting said device in inclined position with the lower end of the device normally in the path of said cutting knife, means for adjusting the device relative to said member to raise and lower it, said member being slidably mounted upon a rock shaft pivoted to the machine frame near the top thereof, said member and optical device being urged to a position such that the lower end of said device is above said cutting line, an adjustable abutment for accurately determining the final position of the lower end of said device, and means for rocking said shaft as the knife is moved to cut the sheets to thereby automatically move said device out of the path of said knife, said member and device return to normal as the knife is returned to normal position.

14. A cutter having a table for supporting a stack of sheets to be cut, a movable cutting knife, a movable clamp for holding the sheets to be cut, a rock shaft supported on said machine, an elbow lever slidably mounted on said rock shaft, one arm of said elbow lever being connected to said clamp, and an optical device adjustably carried by the other arm of said lever, said optical device including means for projecting an image showing the relative position of the sheets to be cut and the cutting line to a position where said relative position may be readily observed by an operator in his normal position in control of the machine.

15. An attachment for machines of the class described having a movable cutting knife, comprising a support adapted to be attached to a machine, a device carried by said support adapted to be positioned adjacent the cutting line of the machine, a portion of said device being normally in the path of the cutting knife of the machine, means associated with said device for accurately indicating to the operator, in his normal position in control of the machine, the position of the sheets to be cut relative to the cutting line, and means automatically moving said device out of the path of said cutting knife when the machine is operated.

16. An attachment for machines of the class described for readily and accurately indicating the position of sheets to be cut relative to the cutting line of the machine, comprising a support adapted to be attached to a machine, an optical device carried by said support and adapted to be positioned adjacent the cutting line of the machine, a reticle carried by said device and positioned where it is readily visible to an operator from his normal position in control of the machine, a replica of the cutting line of said machine on said reticle, and means associated with said optical device for projecting an image of a portion of the sheets to be cut onto said reticle.

17. An attachment for machines of the class described having a movable cutting knife, comprising a support adapted to be attached to a machine, an optical device carried by said support and adapted to be positioned adjacent the cutting line with a portion of said device in the path of said cutting knife, said optical device having means associated therewith for projecting an image indicating the position of the sheets to be cut relative to the cutting line of the machine, and means adapted to be attached to a movable part of said machine for automatically moving the optical device out of the path of the cutting knife when the machine is operated.

18. An attachment for machines of the class described for readily and accurately indicating the position of sheets to be cut relative to the cutting line of the machine, comprising a support adapted to be attached to a machine, an optical device carried by said support, said optical device including means for projecting an image to a position where it may be readily observed by an operator showing the sheets to be cut in their position relative to the cutting line, means for adjusting said optical device relative to said sheets, and means for focusing said optical device.

THOMAS R. JONES.